US008622885B2

(12) United States Patent
Mersky

(10) Patent No.: US 8,622,885 B2
(45) Date of Patent: Jan. 7, 2014

(54) METHODS AND APPARATUS FOR ALIGNING ANTENNAS OF LOW-POWERED INTRA- AND EXTRA-ORAL ELECTRONIC WIRELESS DEVICES

(75) Inventor: Barry L. Mersky, Bethesda, MD (US)

(73) Assignee: Audiodontics, LLC, Bethesda, MD (US)

( * ) Notice: Subject to any disclaimer, the term of this patent is extended or adjusted under 35 U.S.C. 154(b) by 798 days.

(21) Appl. No.: 12/708,569

(22) Filed: Feb. 19, 2010

(65) Prior Publication Data

US 2011/0207990 A1 Aug. 25, 2011

(51) Int. Cl.
*G02C 11/06* (2006.01)

(52) U.S. Cl.
USPC .............................. 600/25; 381/312; 381/151

(58) Field of Classification Search
USPC ............................................ 600/25; 381/312
See application file for complete search history.

(56) References Cited

U.S. PATENT DOCUMENTS

| | | | | |
|---|---|---|---|---|
| 2,995,633 | A | 8/1961 | Puharich | |
| 3,440,314 | A | 4/1969 | Frisch | |
| 4,096,637 | A | 6/1978 | Stade | |
| 5,033,999 | A | 7/1991 | Mersky | |
| 5,117,835 | A * | 6/1992 | Mick | 600/561 |
| 5,326,349 | A | 7/1994 | Baraff | |
| 5,447,489 | A | 9/1995 | Issalene et al. | |
| 5,460,593 | A | 10/1995 | Mersky et al. | |
| 5,558,091 | A | 9/1996 | Acker et al. | |
| 5,769,891 | A | 6/1998 | Clayton | |
| 6,009,878 | A | 1/2000 | Weijand et al. | |
| 6,047,163 | A | 4/2000 | Miyoshi | |
| 6,239,705 | B1 | 5/2001 | Glen | |
| 6,394,969 | B1 | 5/2002 | Lenhardt | |
| 6,473,512 | B1 | 10/2002 | Juneau et al. | |
| 6,823,195 | B1 | 11/2004 | Boesen | |
| 7,072,718 | B2 | 7/2006 | Von Arx et al. | |
| 7,153,257 | B2 | 12/2006 | Schneider et al. | |
| 7,269,266 | B2 | 9/2007 | Anjanappa et al. | |
| 7,796,769 | B2 | 9/2010 | Abolfathi | |
| 7,945,068 | B2 | 5/2011 | Abolfathi et al. | |
| 2004/0202344 | A1 * | 10/2004 | Anjanappa et al. | 381/364 |
| 2008/0106419 | A1 * | 5/2008 | Sakama et al. | 340/572.7 |
| 2009/0022351 | A1 | 1/2009 | Wieland et al. | |
| 2009/0048508 | A1 | 2/2009 | Gill et al. | |
| 2009/0052698 | A1 * | 2/2009 | Rader et al. | 381/151 |
| 2009/0270673 | A1 | 10/2009 | Abolfathi et al. | |
| 2009/0274325 | A1 | 11/2009 | Abolfathi | |
| 2009/0281433 | A1 | 11/2009 | Saadat et al. | |
| 2010/0272299 | A1 | 10/2010 | Van Schuylenbergh et al. | |
| 2011/0015466 | A1 | 1/2011 | Waldmann | |

FOREIGN PATENT DOCUMENTS

| | | |
|---|---|---|
| WO | WO 2005/000391 | 6/2005 |

* cited by examiner

*Primary Examiner* — Christine Matthews
*Assistant Examiner* — Joshua D Lannu
(74) *Attorney, Agent, or Firm* — William C. Schrot; AuerbachSchrot LLC

(57) ABSTRACT

The present invention relates generally to the design and optimal placement of transmitting and receiving directional antennas, a priori, as used in intra-oral to extra-oral (or visa versa) wireless electronic systems regardless of the type and purpose of the data transmitted between the antennas (intra-oral and extra-oral). Systems related to the invention transmit data via electromagnetic radio waves or through an inductive loop coupling such as in stimulating the human hearing nerve (inner ear) via dental bone conduction pathway when operating in "receive mode". "Send mode" systems related to the invention transmit non-acoustic information or voice data from inside the mouth to a receiver located outside the mouth.

18 Claims, 12 Drawing Sheets

METHODS AND APPARATUS FOR ALIGNING ANTENNAS OF LOW-POWERED INTRA- AND EXTRA-ORAL ELECTRONIC WIRELESS DEVICES

CROSS-REFERENCE TO RELATED APPLICATIONS

1. Field of the Invention

The present invention relates generally to the design and optimal placement of transmitting and receiving directional antennas. The antennas are elements in intra-oral to extra-oral (or visa versa) wireless electronic systems. Systems related to the invention transmit data via electromagnetic radio waves or through an inductive loop coupling. One embodiment of a system related to the invention provides stimulation to the inner ear via dental bone conduction pathway when operating in "receive mode". "Send mode" systems related to the invention transmit non-acoustic information or voice data from inside the mouth to a receiver located outside the mouth. For this invention, the type and purpose of the data transmitted between the antennas (intra-oral and extra-oral) does not matter; the invention relates to how the antennas have been optimally designed and favorably aligned and oriented on the skull of a living person.

2. Background of the Invention

Various designs exist for dental bone conduction hearing aid systems that use radio transmission of external ambient sound from an extra-oral device to an intra-oral device. Such devices function as receivers of radio frequency-modulated (FM) or amplitude-modulated (AM) transmission. Examples include U.S. Pat. No. 2,995,633 (Puharich), U.S. Pat. No. 5,447,489 (Issalene), U.S. Pat. No. 5,033,999 (Mersky), U.S. Pat. No. 5,460,593 (Mersky). U.S. Pat. No. 5,326,349 discloses an artificial larynx device having a mouth unit comprising a radio frequency receiver of pulse-width modulated signals transmitted from a hand-held unit to an antenna inside the mouth unit.

Many devices rely on the "send mode" of transmitting non-acoustic signals recorded in the bone conduction pathway or through the body. Examples of this art include "ear microphones" such as described in U.S. Pat. No. 6,823,195. U.S. Pat. No. 6,047,163 describes a miniature loop antenna placed on the wrist with the two antenna leads capacitively-coupled through the body. Other art, more pertinent to this invention, describe tooth microphones ("send mode") from a first unit worn inside the mouth to a radio receiver second unit worn outside the mouth. Examples of this art include U.S. Pat. No. 7,269,266 (Anjannappa). U.S. Patent Publication No. 20090022351 describe an inductive mode of 'send" transmission of speech data from a tooth device having only one antenna—a receive antenna—that responds to changes in the magnetic field created by movement of a magnet attached to a tooth.

U.S. Pat. No. 6,394,969 relates to a tinnitus suppressor and masker. US 20090270673 relates to methods and systems for tinnitus treatment comprising an oral appliance having an electronic and/or transducer assembly for generating sounds via a vibrating transducer element. US 20070280495 discloses various methods and apparatus for processing audio signals. U.S. Pat. No. 5,447,489 relates to a hearing aid device comprising an extra-buccal wireless transmitter part and an intra-buccal wireless receiver transducer part for receiving signals from the transmitter part and comprising at least one vibrating element.

US Published Application No. 20090281433 relates to systems and methods for determining a pulmonary function by mounting one or more sensors intra-orally; capturing intra-oral data; and determining the pulmonary function based on an analysis of the intra-oral data. US 20090274325 relates to methods and apparatus for transmitting vibrations via an electronic and/or transducer assembly through a dental patch. U.S. Pat. No. 7,153,257 relates to an implantable hearing aid system that includes a transducer housing that is rotatable relative to a transducer mounting apparatus to orient the transducer for interfacing with an auditory component. US 2010000611 relates to methods and apparatus for transmitting vibrations via an electronic and/or actuator assembly through a custom-fitted dental appliance.

The "dental bone conduction pathway" should be considered a sub-pathway of the widely recognized non-acoustic 'bone conduction pathway" for sound transmission to the hearing nerve. As used in this invention, the "dental bone conduction pathway" is distinguished from the "bone conduction pathway" in that sound perceived at the hearing nerve originates in structures of the mouth and pharynx. Speech sounds and chewing sounds, for example, travel to the hearing nerve via the "dental bone conduction pathway." By contrast, loud ambient helicopter noise that penetrates the skin over the entire skull, neck, and body and can be considered noise arriving at the hearing nerve via the bone conduction pathway. Similarly, standard bone conduction audiometry with skull stimulation at the mastoid or forehead uses the "bone conduction pathway". The distinction between pathways is important because of anatomical differences between the pathways. The bio-mechanical forces in the dental bone conduction pathway are variable and thus may create variable results when compared to stimulation of structures elsewhere on the skull (at the mastoid or forehead for example). The large resonant chamber, anatomically named as the mouth and oropharynx, has its resonance frequency altered by combinations of opening the mouth and movements of the tongue, lips, and vocal chords (human speech). Other pathway entrances on the skull do not contain such compliant muscles and ligaments (except in the middle ear—although whether the middle ear can be considered "an entrance point" to the bone conduction pathway is an academic question). Also, those other skull areas have far less voluntary muscle and compliant soft tissue (when compared to the tongue and cheeks of the mouth, for example), and more fixed chambers (e.g., frontal sinuses, mastoid air cells, external ear canal), and thus necessarily have more consistent volumes, mechanical loads, and input mechanical point impedances than do structures of the mouth and pharynx; that is, structures comprising the dental bone conduction pathway.

Typically in dental bone conduction systems, one antenna is located in the mouth, while the other external antenna is placed somewhere on the body. This art has failed to teach how to optimally co-locate and align the transmitting and receiving antennas, and without such teachings there is an inability to achieve maximum antenna efficiency, repeatability of signal strength, clarity, and ease of use. With the current art in which the antennas are not optimally aligned, the power necessary for the signal transmission is overdone and thus precious battery power is wasted.

There are many reasons antennas designs for low-power radio and inductive signal transmissions to and from the human mouth have not been taught. One reason is the natural variability in the tissue thickness (of the cheeks, for example). Another reason is the electrical charge of human skin and tissue that creates interference to an internally disposed (in-mouth) antenna. Another problem is that to determine or measure in-situ the actual strength of a low-power electromagnetic signal transmission from/to the mouth is a technological challenge. Finally, slight movements of either antenna during usage will typically result in signal noise or degradation. The means and methods necessary to establish a stable and precisely repeatable co-location of an antenna outside the mouth relative to the antenna worn inside the mouth, has not been taught in the prior art.

In this invention, the internal (intra-oral) and external (extra-oral) antennas are directional and the methodology of the present invention can be used to establish their design, shape, distance, and spatial orientation. Prior to designing the system of antennas a technician can evaluate potential constraints caused by a user's unique physical and anatomical limitations. After evaluation, the technician can design the antennas and precisely match the antennas to the desired transmission band (AM, FM, Ultra Wide Band, Pulse-width, etc. including inductive coupling). Thus, this invention provides the technician the ability to evaluate a priori the spatial configuration of a specific human skull before designing the send-receive system. This novel ability for system design will result in optimum gain, polarization, and overall signal transmission efficiency of the antenna components of the desired system, whether the system is "send-only", "receive-only" or a combination of "send-receive".

SUMMARY OF THE INVENTION

Accordingly, this invention relates to an apparatus and method for co-locating and orientating a matching pair of directional antennas in wireless electronic signal transmission systems having a first unit worn inside the mouth and a second unit worn outside the mouth. An overall functional system requires both intra-oral and extra-oral units. As used herein, internal unit refers to a wireless intra-oral device and external unit refers to a wireless extra-oral device. Correspondingly, internal and external antenna are respectively affixed to the intra-oral and the extra-oral electronic devices. In one preferred embodiment, a hearing augmentation system, the intra-oral "receive" antenna is worn in the buccal space, positioned lateral to the maxillary bicuspids and molars (the internal antenna) and the external antenna on the second outside-the-mouth unit is worn on the same side of the skull as the first unit, most preferably attached to the pinna of the ear or worn in or on the external canal of the ear. In another embodiment, the external antenna is won at another ipsilateral location on the skull held firmly in space (relative the internal antenna).

In a hearing augmentation embodiment, two custom impressions are made using novel impression trays, a mouth impression and an ear impression. From the mouth impression, a laboratory technician makes a typical dental cast or stone model. From the ear impression, the technician makes a typical cast of the ear anatomy (as is routinely done in order to fabricate in-ear hearing aids). Another part of the present invention, the mouth-ear alignment tool (described below), is then used by the technician to mount and orient the two casts. It is on these two casts properly seated into the mouth-ear alignment tool, that the actual fabrication of the hearing augmentation system is done.

The novel apparatus proposed by this invention conceptually resembles a dental facebow. Historically in dental practice, a facebow has been used to transfer to a dental articulator apparatus the spatial relationship between the maxillary and mandibular arches and the tempromandibular joint. From recordation of this relationship, the patient's bite and oral anatomy can be recreated on the benchtop. The ultimate result of using the facebow is that oral appliances can be fabricated by technicians that conform properly to the bite of the patient.

For this invention, a novel impression tray for the ear is disclosed. In a preferred embodiment, it is proposed that one professional, a dentist, takes both impressions whereas in the current art, an ear specialist takes an impression of the ear in order to custom fit a hearing aid. Finally for other embodiments, primarily the "SEND-Mode" embodiment, methods and means are disclosed which allow for a self-customized external unit (extra-oral) to be easily and optimally placed on the skull (relative to the internal unit (intra-oral)).

Accordingly, through the use of the two impressions, the laboratory technician can build embodiments and systems which require antennas that optimally match and align for the given application factors and anatomical constraints. For example, space limitations may dictate the battery size of the mouth-worn (internal) system, and hence with limited power available, the alignment of the antenna elements may be a more critical factor than whether to use radio transmission versus inductive coupling. Cosmetic considerations may factor into the design and placement of the external antenna. For other applications, regulatory restraints may dictate the transmission band available, and hence the configuration of the antenna is determined by transmission frequency allowed by the regulatory agency. In embodiments for military operations where many soldiers may be closely co-located and seek covert transmission or on-the-move usage, the overall system design including antenna selection must accommodate these specialized situations. Hence the matching of the application with the antenna design can be best achieved through the methods of the present invention.

The low-powered transmitter signals of the instant wireless electronic system may be in any wireless form utilizing, e.g., magnetic inductive coupling, radio frequency, Blue Tooth band®, etc. for transmission to and from the intra-oral unit.

In a preferred embodiment it is herein taught that two or more different types of mouth-safe materials should be used to pot the internal electronic system and affix it in the mouth. The antenna itself should be potted in a mouth-safe, non-toxic silicone that because of its chemistry is thermally and electrically non-conductive with a high "Q" value. (An example of such material is Med2-4013 from Nusil Corporation, Carpintina, Calif.) This potting material is taught because the Inventor has found that typical dental materials such as methacrylates or compounds that use ultra-violet or free-radical polymerization methods cause electrical interference when they directly pot a low-powered antenna. Even typical conformation sprays and coating recommended by manufacturers as methods of sealing antennas from moisture and dust have been shown to be inadequate (if not mouth unsafe) for the potting of the internal antenna. The reason typical dental polymers (methylacrylates, urethanes, etc.) cause radio interference is presently unknown but may be because low levels of free radicals remain uncured in those materials. The remainder of the intra-oral unit, such as that part which contacts the gingiva or teeth and houses the control circuits and power supply, is potted in typical dental materials such as urethanes, composites, nylons, thermoplastics, etc. These materials are needed to provide rigidity and hardness, and to pot in a safely manner the other electrical components of the internal system, such as the control circuit and batteries.

The power supply of the present invention may be a simple battery, replaceable or permanent, other variations may include a power supply which is charged by inductance via an external charger. Additionally, the power supply may alternatively be charged via direct coupling to an alternating current (AC) or direct current (DC) source. Other variations may include a power supply which is charged via a mechanical mechanism, such as an internal pendulum or slidable electrical inductance charger as known in the art, which is actuated via, e.g., motions of the jaw and/or movement for translating the mechanical motion into stored electrical energy for charging power supply.

It is also to be understood that the internal antenna can be either send or receive depending on the purpose of the associated unit or device. Where the device is a hearing aid, then the intra-oral antenna is a "receive" antenna. If the device is a tooth microphone to record, for example, breath or physiological sounds, then the antenna functions as the "send" antenna of the paired antennas. If the overall system is intended for two-way voice communication, then the internal antenna potentially can function as both the send and the receiving antenna. In this situation, the voice communication system will be half-duplex because it cannot send and receive simultaneously. In preferred embodiments, the distance between the antenna pair (internal—external) is preferably less than six inches.

The intra-oral antenna is preferably designed as a loop and disposed in the buccal space. (The buccal space is that distendable area inside the cheek and laterally adjacent to the maxillary molars.) The loop may have any suitable diameter but preferably not exceeding one inch. It is not necessary, however, that the paired internal and external antennas have the same radius, cross-sectional area, or design. Instead the design of the other antenna (in this example, the external unit) depends upon many factors, such as cosmetics, the specific band of transmission and the anticipated strength of the signal transmission. Thus for this invention, the two antenna designs can vary, so long as their orientation is determined beforehand, and the units and antenna pair remain fixedly disposed during usage.

Accordingly, it is one object of the invention to provide a methodology and an apparatus for optimal linear polarization of inside-mouth/outside-mouth directional antennas for low powered radio and inductive loop transmission in wireless electronic system wherein the location and orientation of the intra-oral antenna is positioned and re-positioned with accuracy. This internal unit is located and retained in its position through precise mechanical attachment to the teeth and other oral structures (including dental implants). It is understood by those of ordinary skill in the art that re-positioning of certain oral appliances, such as removable partial dentures with precision attachments, typically occurs to within less than 0.2 mm of variance over a several year period, even with daily usage by a person. Such will be the design of the internal unit, and thus the spatial orientation of the internal antenna can be known and assured.

It is yet another object of the invention to provide a methodology and an apparatus for optimal directional pairing of inside-mouth/outside-mouth antennas for low powered radio and inductive loop transmission in a wireless electronic system wherein the location and orientation of the extra-oral antenna is determined through the use of a novel mouth-ear alignment tool. Positional retention of the external antenna can be achieved through one or any combination of methods to fit into or around the ear cartilage, or within the external canal of the ear. Also skin tapes and adhesives, or spring pressure from, for example, waxes, gels, foams, straps of a helmet, ear-loops, ear-hooks, and other devices and methods can aid in the retention.

Another object of the invention provides a wireless electronic system comprising an intra-oral directional antenna and a companion extra-oral directional antenna respectively affixed to a first intra-oral unit and a second companion extra-oral unit wherein the intra-oral unit comprise transducer(s) for transducing electrical energy to mechanical energy and vice versa, said intra-oral unit imparting low amplitude vibrations to teeth for conduction via the dental bone conduction pathway to the inner ear, or conversely transducing vibrations within said dental bone conduction pathway to electrical energy; said electrical energy is magnetically induced or electromagnetically transmitted by to and from the intra-oral antenna to the extra-oral antenna and wherein said intra-oral and extra-oral antennas are stably, fixedly and spatially oriented relative to each other, a priori, for optimal gain and polarization.

As used in this specification, the transducer can be a device, usually electrical, electronic, electromechanical, electromagnetic, photonic, or photovoltaic that converts one type of energy or physical attribute to another for various purposes including measurement or information transfer. The transducer can also act as a sensor, used to detect a parameter in one form and report it in another (usually an electrical or digital signal), and can also act as an audio loudspeaker, which converts electrical voltage variations representing music or speech, to mechanical cone vibration and hence vibrates air molecules creating acoustical energy.

The wireless electronic system may receive incoming sounds either directly or through a receiver to process and amplify the signals and transmit the processed sounds via a vibrating transducer element coupled to a tooth or other bone structure, such as the maxillary, mandibular, or palatine bone structure.

In a preferred embodiment, the strength of the magnetic field transmitted to and from the companion antennas is less than or equal to 0 dBM. In yet another preferred embodiment, the intra-oral antenna is directly potted by medical grade silicone with a high "Q-value." In another embodiment, the chemically set silicone potting material is further encased by mouth safe polymers that contact the oral tissues of a person.

It is another object of the invention to provide a dental bone conduction hearing aid comprising the wireless electronic system of the present invention, wherein the application of low-amplitude vibration to the teeth and conduction to the inner ear results in perception of speech.

It is yet another object of the invention to provide a method of treating or reducing the effects of motion sickness using the wireless electronic system of the present invention said method comprising the application of low-amplitude vibration to the teeth and conduction to the inner ear to treat or reduce the effects of motion sickness through cancellation of low frequency waves at the otolith.

It is yet another object of the invention to provide a method of treating or reducing stuttering using the wireless electronic system of the present invention, said method comprising the application of low-amplitude vibration to the teeth and conduction to the inner ear through a feed-back system whereby the system is two-way send/receive which recognizes stuttering and sends blocking signal. In another embodiment, the wireless electronic system of the present invention can play frequency shifted and delayed version of the sound directed at the patient and this delayed playback stops the patient's stuttering. For example, the sound is frequency shifted by about 500 Hz and the auditory feedback can be delayed by about 60 ms thereby reducing stuttering and producing speech more natural than without the system.

It is yet another object of the invention to provide a method of treating tinnitus using the wireless electronic system of the present invention. Tinnitus is a condition in which sound is perceived in one or both ears or in the head when no external sound is present. Such a condition may typically be treated by masking the tinnitus via a generated noise or sound. In one variation, the frequency or frequencies of the tinnitus may be determined through an audiology examination to pinpoint the range(s) in which the tinnitus occurs in the patient. This frequency or frequencies may then be programmed into the intra-oral device which is configured to generate sounds which are conducted via the user's tooth or bones to mask the tinnitus. One method for treating tinnitus may generally comprise masking the tinnitus where at least one frequency of sound (e.g., any tone, music, or treatment using a wide-band or narrow-band noise) is generated via transducer positioned against at least one tooth such that the sound is transmitted via vibratory conductance to an inner ear of the patient, whereby the sound completely or at least partially masks the tinnitus perceived by the patient. In generating a wide-band noise, the sound level may be raised to be at or above the tinnitus level to mask not only the perceived tinnitus but also other sounds. Alternatively, in generating a narrow-band noise, the sound level may be narrowed to the specific frequency of the tinnitus such that only the perceived tinnitus is masked and other frequencies of sound may still be perceived by the user. Another method may treat the patient by habituating the patient to their tinnitus where the actuator may be vibrated within a wide-band or narrow-band noise targeted to the tinnitus frequency perceived by the patient overlayed upon a wide-frequency spectrum sound. This wide-frequency spectrum sound, e.g., music, may extend over a range which allows the patient to periodically hear their tinnitus through the sound and thus defocus their attention to the tinnitus. In enhancing the treatment for tinnitus, a technician, audiologist, physician, etc., may first determine the one or more frequencies of tinnitus perceived by the patient. Once the one or more frequencies have been determined, the audiologist or physician may determine the type of treatment to be implemented, e.g., masking or habituation. Then this information may be utilized to develop the appropriate treatment and to compile the electronic treatment program file which may be transmitted, e.g., wirelessly, to a processor coupled to the transducer such that the transducer is programmed to vibrate in accordance with the treatment program. Thus one embodiment of the invention is to provide a method of treating tinnitus using the wireless electronic system of the present invention, said method comprising the application of low-amplitude vibration to the teeth and conduction to the inner ear by supplying a low-level "white noise" type of signal via the dental bone conduction pathway.

It is yet another object of the present invention to provide a wireless electronic system, wherein detection by a sensor such as tooth microphone of the low-amplitude vibration from the teeth or within the dental bone conduction pathway results in a signal that can be transmitted to a receiver unit worn outside the mouth, said receiver unit being capable of storing that data or further uplinking it to another system. The detection of the low-amplitude vibration from the teeth or within the dental bone conduction pathway can also result in a means for transmitting non-speech breath sounds to another listener or recording device for the measurement of pathological breath sounds. The pathological breath sounds can comprise any one of breath obstructions pertinent to the diagnosis of obstructive sleep apnea, respiratory conditions such as wheezes, or wales related to respiratory disease, speech impediments such as "low-voice", dysphonia, diseases and conditions related to the malfunctioning of vocal cords, or dysphagia and other problems related to swallowing.

It is yet another object of the invention to provide a wireless electronic system further comprising a means for detecting skull vibration from the teeth or within the dental bone conduction pathway and transmitting the amplitude of the skull vibration to a human listener or recording device for determining whether there has been an abnormal skull acceleration or trauma, such trauma potentially damaging the brain.

It is yet another object of the invention to provide a method of custom fit placement of an intra-oral unit in a wireless electronic system, said system comprising an intra-oral directional antenna and an extra-oral directional antenna respectively affixed to a first intra-oral unit and a second companion extra-oral unit wherein the intra-oral unit comprise actuators or transducers for transducing electrical energy to mechanical energy and vice versa, said intra-oral unit imparting low amplitude vibrations to teeth for conduction via the dental bone conduction pathway to the inner ear, or conversely transducing vibrations within said dental bone conduction pathway to electrical energy; said electrical energy is magnetically induced or electromagnetically transmitted by an intra-oral directional antenna and an extra-oral directional antenna and wherein said intra-oral and extra-oral antennas are stably, fixedly and spatially oriented relative to each other, a priori, for optimal gain and polarization, said method comprising the steps of: stably and fixedly seating the intra-oral unit in a custom fit position on the maxillary arch; wherein a dental precision attachment means is used to maintain the stability of the intra-oral unit. Such means are known to artisans in the dental arts and easily available from a "Precision Attachment Catalogue" by Sterngold, Inc. (Attleboro, Mass.) for example. The dental precision attachment means also can comprise customized claws and hooks that engage at least one tooth in said maxillary arch. The dental precision attachment means can also comprise a spring-loaded customized appliance such as what occurs with Valplast (Long Island City, N.Y.) that positions said intra-oral unit around teeth in the maxillary arch. The dental precision attachment means can also comprise oral denture adhesive applied to the polymer, resin, metal, or other dental material that contacts the soft tissue areas of the maxillary arch. Preferably, the dental precision attachment means comprise male-female components one of which is attached to at least one tooth or dental implant and are removably engageable to each other through friction-fit, press-fit or spring-force, said attachment means used to position said intra-oral unit in the maxillary arch. In all cases, in order to transmit the vibrations corresponding to the received auditory signals efficiently and with minimal loss to the tooth or teeth, secure mechanical contact between the actuator and the tooth is ideally maintained to ensure efficient vibratory communication. Accordingly, any number of mechanisms may be utilized to maintain this vibratory communication.

It is yet another object of the present invention to provide a method of spatial orientation a priori of an intra-oral directional antenna relative to an extra-oral directional antenna in a wireless electronic system, said system comprising an intra-oral directional antenna and an extra-oral directional antenna respectively affixed to a first intra-oral unit and a second companion extra-oral unit wherein the intra-oral unit comprise actuators or transducers for transducing electrical energy to mechanical energy and vice versa, said intra-oral unit imparting low amplitude vibrations to teeth for conduction via the dental bone conduction pathway to the inner ear, or conversely transducing vibrations within said dental bone conduction pathway to electrical energy; said electrical energy is magnetically induced or electromagnetically transmitted by the intra-oral and the extra-oral antennas and wherein said method comprises the steps of: making a custom maxillary arch impression on an impression tray to capture the anatomical details of a user's maxillary arch; optionally making a custom pinna and/or ear canal (ear) impression; determining the spatial relationship between the maxillary arch and the ear anatomy using an alignment tool; determining the optimal linear polarization between the intra-oral antenna and the extra-oral antenna on said impressions based on said spatial relationship; stably, fixedly, and precisely attaching the intra-oral and extra-oral antennas on the intra-oral and extra-oral units respectively; stably and fixedly seating said intra oral and extra oral units with said spatially oriented antennas in their respective custom fitting positions on the skull of said user.

It is yet another object of the invention that the maxillary arch and ear impressions are made with any non-toxic material such as polyvinylsiloxane which can capture soft and hard tissue details with less than one percent distortion.

In one embodiment, a magnet of less than 2 mm in diameter is disposed on or about the intra-oral unit wherein its planar alignment and center reflects the optimum transmission point of the intra-oral directional antenna as determined before the unit was placed into the mouth.

In another embodiment, the extra-oral directional antenna can be oriented in a direction designated by an alignment marker and determined by an apparatus adaptable for use with said alignment tool, said apparatus comprising an alignment marker and magnetic needles embedded therein, said needles capable of aligning to a magnetic field emanating from the intra-oral cavity, wherein said apparatus can point to the optimal orientation of an antenna located in the mouth; said optimal orientation indicated by parallel alignment of the alignment marker to the magnetic needles. In one embodiment, the orientation of said oriented extra-oral directional antenna is held in place using means such as deformable semi-rigid tubing, skin tapes, waxes, ear hooks, or straps.

It is yet another object of the invention to provide an alignment tool constructed to transfer to a location away from the face the spatial relationship between the maxillary arch and the ear anatomy, said tool comprising means for anatomically simulated collocation of the maxillary arch impression and the ear impression. The alignment tool further comprises a mouth tray holding portion and an ear tray holding portion extendably joined at a disconnection sleeve wherein the mouth tray holding portion comprises an oral impression material holding tray, that is ball-jointedly connected to the mouth tray holding portion; and an ear tray holding tray that is ball-jointedly connected to the ear tray holding portion; said tool designed and configured to precisely align a user's maxillary arch impression with an ear, ear-hook, and/or ear canal impression, said mouth tray holding portion further comprising a laboratory stand mounting means for aid in remotely reproducing the anatomically simulated collocation of the oral impression and the ear impression.

In one embodiment of the alignment tool, the ear impression holding tray and the mouth impression holding tray are slidably connected to the ear tray holding portion and the mouth tray holding portion respectively via tray mounting means and wherein calibration scales are optionally provided along portions in slidable engagement with the tray mounting means. In another embodiment of the alignment tool, the disconnection sleeve comprises matable half-round rounds which extend from the ear tray holding portion and the mouth tray holding portions of the tool in an opposable manner and further comprises retaining pins and opposed pin holes for calibrated extension and disconnection of the ear tray holding portion from the mouth tray holding portion.

This invention also provides an otoblock device adaptable for use in the alignment tool comprising a thin deformable wire intertwinable with a fine mesh material, said device comprising on one terminal end a mesh-work for use as an otoblock during ear impression taking, and on the other terminal end, a precision block which is fixably and rigidly connected to the ear tray holding portion of the alignment tool.

In one embodiment, a non-magnetic apparatus adaptable for use in the alignment tool is provided in lieu of the ear impression tray, said apparatus comprising an alignment marker and magnetic needles embedded therein, said needles capable of aligning to a magnetic field emanating from intra-oral cavity, wherein said apparatus can point to optimal orientation of an antenna located in the mouth; said optimal orientation indicated by parallel alignment of the alignment marker to the magnetic needles.

The methodology of the present invention is easily adaptable to a situation where more than one intra-oral unit is desired. For example, multiple transducer assemblies may be placed on multiple intra-oral units. Although they are typically mounted on the upper row of teeth, multiple intra-oral units may alternatively be positioned and located along the lower row of teeth or both rows as well. Moreover, each of the transducers may be configured to transmit vibrations within a uniform frequency range. Alternatively in other variations, different intra-oral units may be configured to vibrate within non-overlapping frequency ranges between each unit. As mentioned above, each transducer can be programmed or preset for a different frequency response such that each transducer may be optimized for a different frequency response and/or transmission to deliver a relatively high-fidelity sound to the user.

BRIEF DESCRIPTION OF PREFERRED EMBODIMENTS OF THE INVENTION

In the drawings, wherein like reference numerals identify similar elements:

DETAILED DESCRIPTION OF PREFERRED EMBODIMENTS OF THE PRESENT INVENTION

Figure 1:
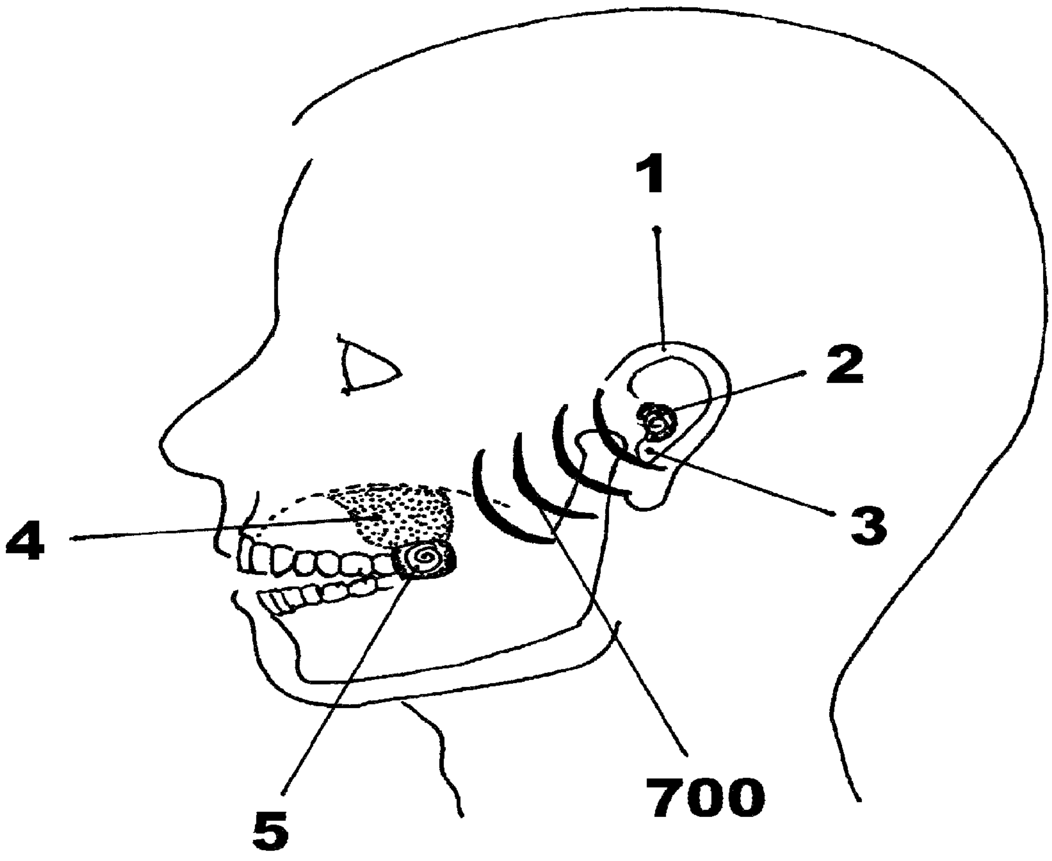
FIG. 1 illustrates an overall system view according to a typical embodiment of the invention.
Figure 2:
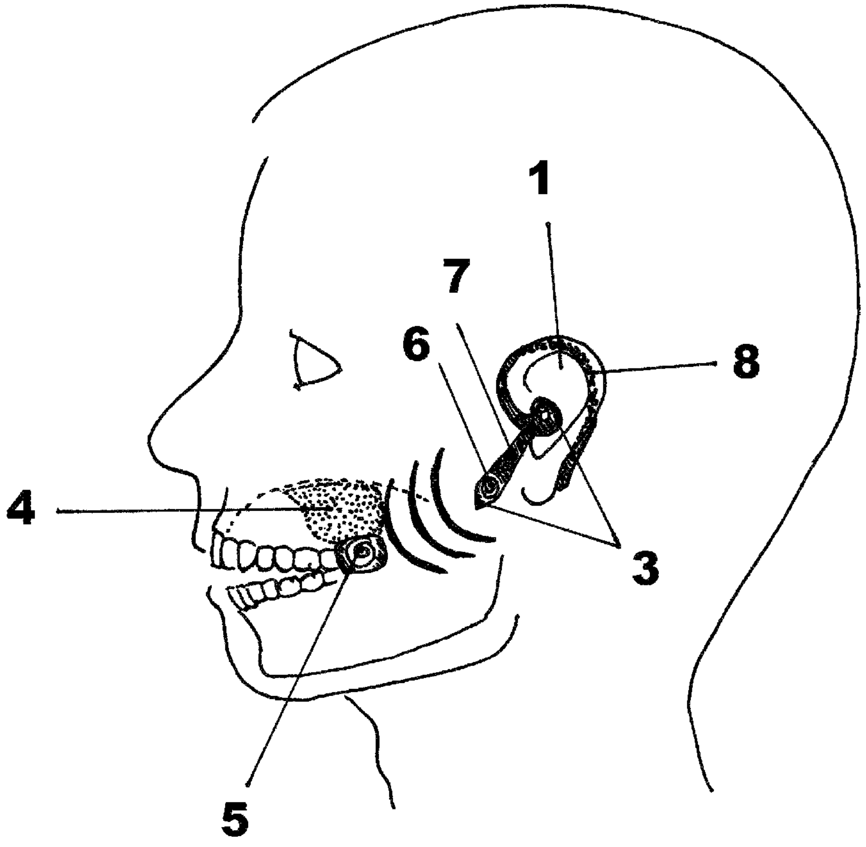
FIG. 2 illustrates a Hearing Aid System (Receive Mode) according to one embodiment of the present invention.
Figure 3:
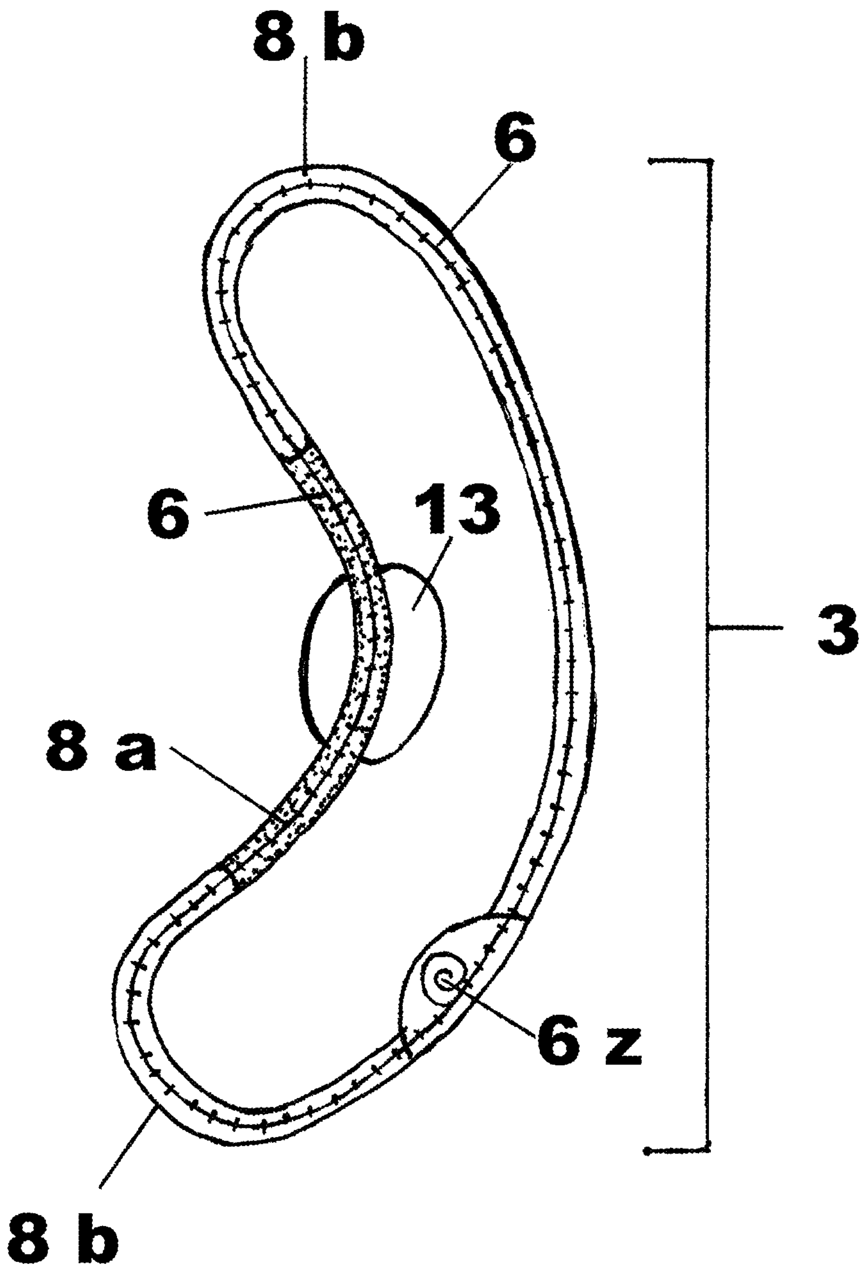
FIG. 3 illustrates another embodiment of the external unit.

Referring now to the drawings of the present disclosure in which like numbers represent the same structure in the various views, FIG. 1 illustrates an overall system view of a low powered transmission 700 from the external unit 3 to the internal unit 4 and vice versa according to a typical embodiment of the invention. The external unit 3 contacts either the tissue of the pinna 1 or external ear canal 2. The antenna element from the external unit 3 is not shown in FIG. 1 as it is internally placed within the cartilaginous external ear canal 2. Other placements of the extra-oral antenna element are shown in FIGS. 2 and 3. The internal unit 4 placed in the mouth comprises an antenna 5 preferably potted in a material P, shown in FIG. 6, such as medical grade silicone and may further be encased in a mouth safe polymer. In the preferred embodiment the intra-oral antenna 5 is disposed in the buccal space area of the mouth.

FIG. 2 illustrates a Hearing Aid System (Receive Mode) according to another embodiment of the present invention. In this embodiment an impression has been taken of the ear canal 2 using an ear impression tray 190. The retention of the external unit 3 occurs through customization of the housing to the ear canal 2 by a laboratory technician. Depending on the depth of penetration within the ear canal 2, this housing is further described as either embodiment 13 or 14 in FIG. 6. In FIG. 2, the external antenna 6 is shown as being a loop antenna which would be a preferred design if the signal transmission means is inductive coupling. However, other antenna configurations could be used if the anatomy, space, transmission band or intended function, indicate that a different antenna design or configuration would be more efficient. The external unit 3 further comprises a connecting wire 7 to the other components of the external unit and an additional retaining feature 8, which in this Figure is an ear-loop.

The signals transmitted may be received by electronics and/or transducer assembly via a receiver, which may be connected to an internal processor for additional processing of the received signals. The received signals may be communicated to the transducer, which may vibrate the tooth to conduct the vibratory signals through the tooth and bone and subsequently to the inner ear to facilitate hearing of the user. The transducer may be configured as any number of different vibratory mechanisms. For instance, in one variation, the transducer may be an electromagnetically actuated actuator such as would be the case with a magnetostrictive material as a core. In other variations, the actuator may be in the form of a piezoelectric crystal having a range of vibratory frequencies, e.g., between 250 to 20,000 Hz.

The spatial location of the external antenna 6 along the cheek is not random, but was determined a priori by a technician using the mouth-ear alignment tool 100. With use of tool 100, the laboratory technician analyzed several factors including the potential retention sites for the external unit 3. In this example, the technician decided that for comfort, ease-of-use, etc, an ear-loop in combination with natural retention provided by cartilaginous folds of the ear, retention and unit rigidity could be achieved so that the external unit 3 maintains the alignment/orientation of the external antenna 6 relative to internal antenna 5.

FIG. 3 illustrates another embodiment of the external unit 3. In this embodiment, the retention features of the external unit 3 can be considered as self-customized. By "self-customized" it is understood from prior art (the Sony Sport Headphones Model MDRAS20J for example) that "spring-loaded" or foam earplugs when combined with an ear-loop can create a stable and non-moving appliance that can be worn in the ear for extended periods and during active movement. In this embodiment, a novel method is employed by the user to locate the internal antenna 5 of the internal unit and determine its optimum "directionality". Without the instant invention, the user would need a "trial by error" method of moving the external unit 3 and external antenna 6 until it "seems OK". In this embodiment, the pointer 400 (See FIG. 11) on the alignment tool helps the user locate the internal antenna. Once the optimum orientation is shown by the pointer tool 400, the external unit 3 and external antenna 6 can be tilted or oriented to properly match the directionality of the internal antenna 5. It is anticipated that through everyday usage of the external unit 3, the user will soon adapt and learn how the unit feels and fits into or about their ear. Thus if during usage the unit moves, it is anticipated that by having learned how the unit should feel in one's ear for optimum signal transmission, the user will recognize that a misfit has occurred, and the antennas therefore are no longer optimally aligned.

The optimal a priori alignment of the external antenna 5 and the internal antenna 6 is important particularly when the system is being used in 'SEND-MODE" or transmit-mode, such as would occur if the internal unit 4 was a tooth microphone or a tooth sensor. In these applications which wirelessly transmit speech or physiological data from inside the mouth without a side-tone supplied to the ear (and the normal ability to hear it), it is difficult for the user to know when the two antennas (5 and 6) have become misaligned and are not optimally transmitting a signal. By contrast, in "Receive-mode", i.e., a hearing aid or as a listening unit for voice communication, there is a higher likelihood that the user can become aware of antenna misalignment because he will hear a "fuzzy" or distorted signal. In the "send-mode" without a side-tone feature, the user has no way of knowing whether the antennas were originally set properly or verifying during usage whether the antenna (5 and 6) remain properly aligned.

In FIG. 3, the self-customized retaining ear-loop 8 has associated with it a wrapped wire external antenna 6. In this embodiment, the ear-loop has a metal spring tube 8*a* and rubber or silicone tube 8*b* that surrounds and goes behind the pinna 1. In this example, the metal tube spring 8*a* provides stability and retention to the external unit 3 by exerting a force directed medially (into the ear) on the conformation self-customized plug 13, and on the spring-like rubber (or other material) tube 8*b*. To customize this embodiment the user squeezes and conforms this deformable metal tube to optimally align the external antenna 6 as shown through use of the pointer 400. (See FIG. 11 for a detailed description for use of pointer 400.) The wrapped wire antenna 6 is shown as running inside the tube 8*a* and 8*b* and has additional turns in the area 6*z*. It should be obvious to one of ordinary skill in the art that elements 6 and 6*z* are just one of many possible configurations for this external unit antenna design 6.

Figure 5:
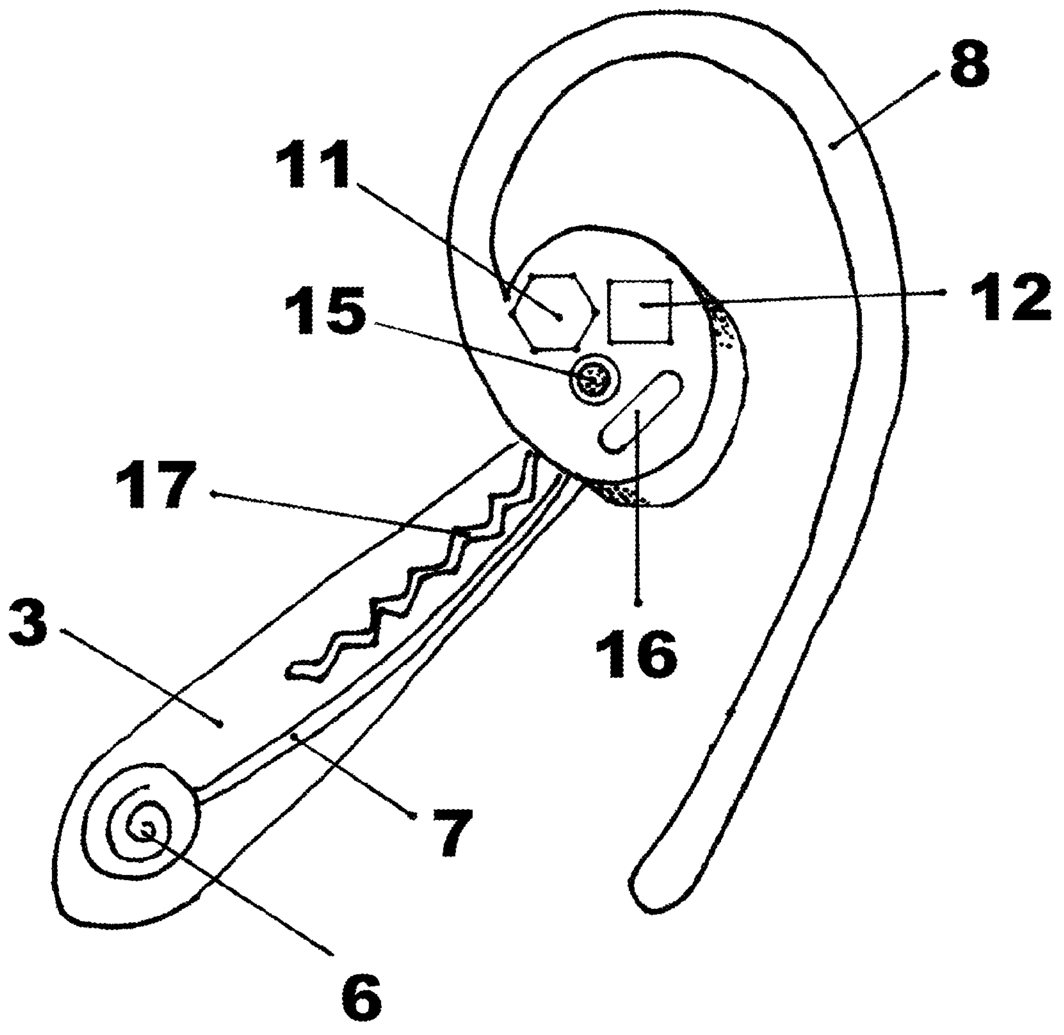
FIG. 5 illustrates another embodiment of the external unit with data logger/transceiver and two antennas.

Additional stabilization of the external unit 3 can be provided by a self-customized ear-plug like housing 13 (See FIG. 6) which may further comprise a vent or hole 15 (See FIG. 5). The vent allows acoustic information to pass unimpeded to the eardrum, and as an example, musicians' earplugs have a vented design. The vent 15 allows the user to experience near normal hearing, which is valuable or perhaps required for certain "send mode" applications in the military.

The positioning and orientation of the extra-oral antenna can be maintained through use of medical-grade adhesive tape, or from straps or spring-like pressure created by a helmet, hat, or other convenience worn on the skull. In applications such as for the military, once the optimal position for the external antenna 6 has been determined, helmet straps can be adjusted to further stabilize the positioning of the external unit 3 and external antenna 6. Alternatively, if application is for the wireless transmission of physiological (non-acoustic) data from the internal unit, a means such as skin tape 18 can be used to secure the antenna is its proper orientation. Different means and methods can be used to secure the external antenna 6 in this self-custom embodiment, once the optimal position of the external antenna 6 relative to the internal antenna 5 has been determined through the understanding of the mouth-ear facebow 100, the pointer 400, and other teachings of this invention.

Figure 4:
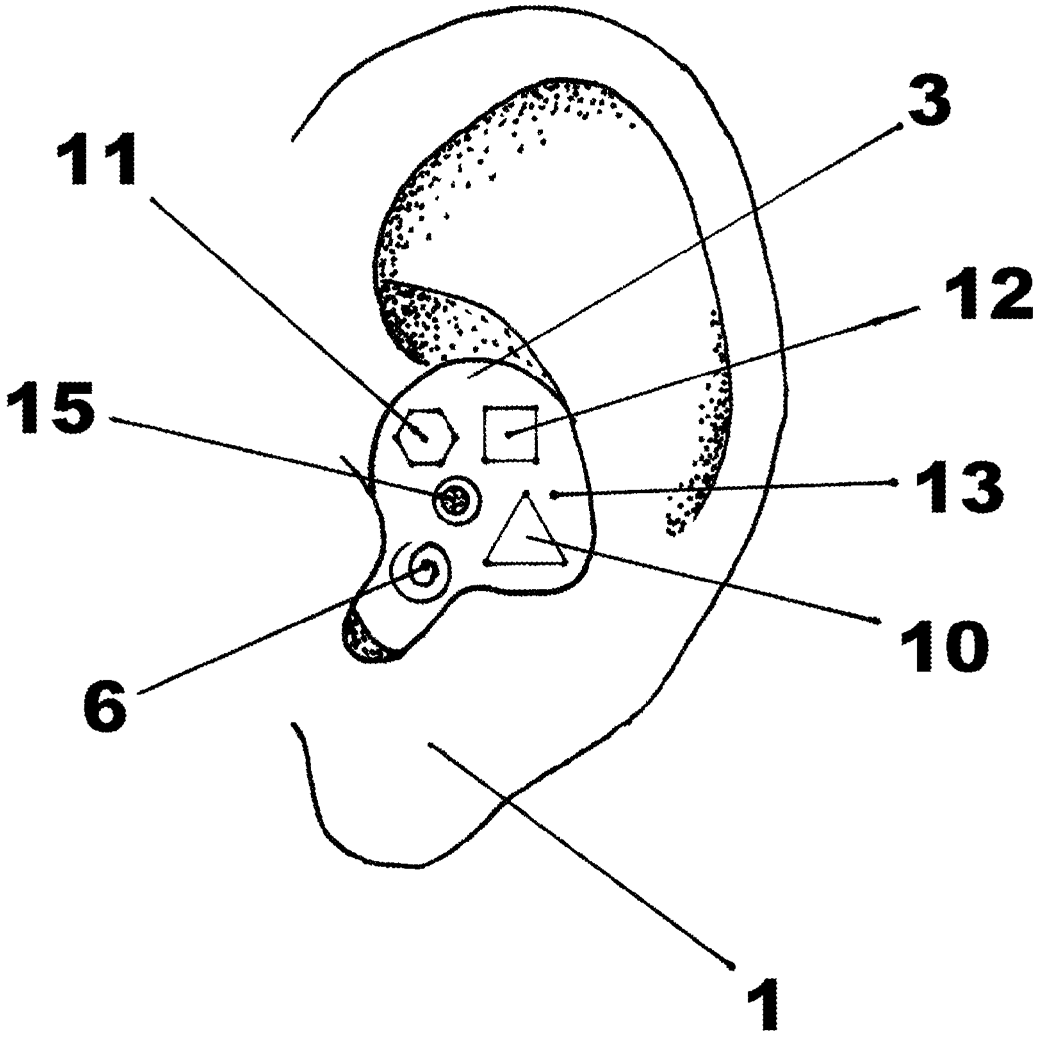
FIG. 4 illustrates a preferred embodiment of the external unit of a Hearing Aid System with microphone (Receive mode).

FIG. 4 illustrates a preferred embodiment of the external unit of a Hearing Aid System with microphone operating in a receive mode. In this embodiment, an ear impression has been made using other elements of the invention, namely the ear tray 190. The external unit 3 is seated partly into the pinna 1 and continues into the external ear canal 2. Specifically since this is a "Receive Mode" system, the external unit 3 comprises a microphone 10 to capture ambient acoustic information (speech, music, noise, etc.), a power supply 11, control circuit or processor 12, connecting wires (not shown), and a transmitting external antenna 6 for transmitting the processed signals to the intra-oral unit. In this embodiment, the external unit 3 transmits to the internal unit 4. The microphone 10 and processor 12 may be configured to detect and process auditory signals in any practicable range, but may be configured in one variation to detect auditory signals ranging from, e.g., 250 Hertz to 20,000 Hertz. It is known to one of ordinary skill in the art that placement of the microphone 10 in the pinna or external ear canal is the preferable location for a hearing aid device because this location captures the most "natural sounds" caused by the shape and folds of the pinna of the ear.

With respect to microphone 10, a variety of various microphone systems may be utilized. For instance, microphone 10 may be a digital, analog, and/or directional type microphone. Such various types of microphones may be interchangeably configured to be utilized with the assembly, if so desired.

The microphone and processor may be configured to detect and process auditory signals in any practicable range, but may be configured in one variation to detect ambient auditory signals ranging from, e.g., 250 Hertz to 20,000 Hertz. The detected and processed signals may be amplified via amplifier, or processed through other digital processing means (DSP) known to those schooled in the art of audio signal processing and DSP. The effect of such DSP may be to increase the output level of the vibrational transducer of the internal unit 4, with such an increase being perceived as an increase in gain or loudness. Through signal compression, gating, etc., other audio effects can be processed by 12 prior to transmission from the external unit 3 to the internal unit 4.

It is also well known to those of ordinary skill in the art that when the ear canal 2 is occluded there is a "boost" in lower frequency sounds, particularly those created in the canal 2 by the bone conduction pathway. The external unit 3 of FIG. 4 further comprises a vent 15 which would not be necessary if the hearing aid system was for an individual with single-sided deafness because this ear would be "dead". If, however, the system application is to provide hearing via the dental bone conduction pathway to those individuals with high frequency sensorineural hearing loss, then a vent in this external unit would be appropriate.

FIG. 5 illustrates another embodiment of the external unit with data logger/transceiver and two antennas. This Figure presumes that the overall system is in "send mode" wherein the internal unit is functioning as a "tooth microphone" or sensor. Since this embodiment is presumed to be a "send-mode" external unit, a vent 15 is provided should the user have normal hearing. This vent functions similarly to the vent of FIG. 4 in that it allows ambient acoustic information to pass into the ear canal while at the same time, reducing the "occlusion effect" well known to artisans of air conduction hearing aids. Unlike the external unit 3 of FIG. 4, the external unit 3 of FIG. 5 does not contain a microphone, but rather comprises a data logger chip or transceiver 16. This chip captures the data from the internal unit 4 and either stores it to be downloaded by other means, or perhaps in real-time further transmits it to another remote storage unit via linkage with a computer or cell-telephone. Such transmission to a cell phone can occur through a secondary antenna 17, which may be tuned to a "Blue-Tooth" network, for example. It is to be understood that this invention is not limited in any way by the purpose, mode of operation or the type of data transmitted to or from the internal unit 4 to the external unit 3 or how such data may be uplinked, saved, or otherwise connected to other systems for different purposes so long as the methodology of the present invention is utilized to optimally collocate the internal antenna 5 with the external antenna 6 particularly in a low-powered system.

Figure 6:
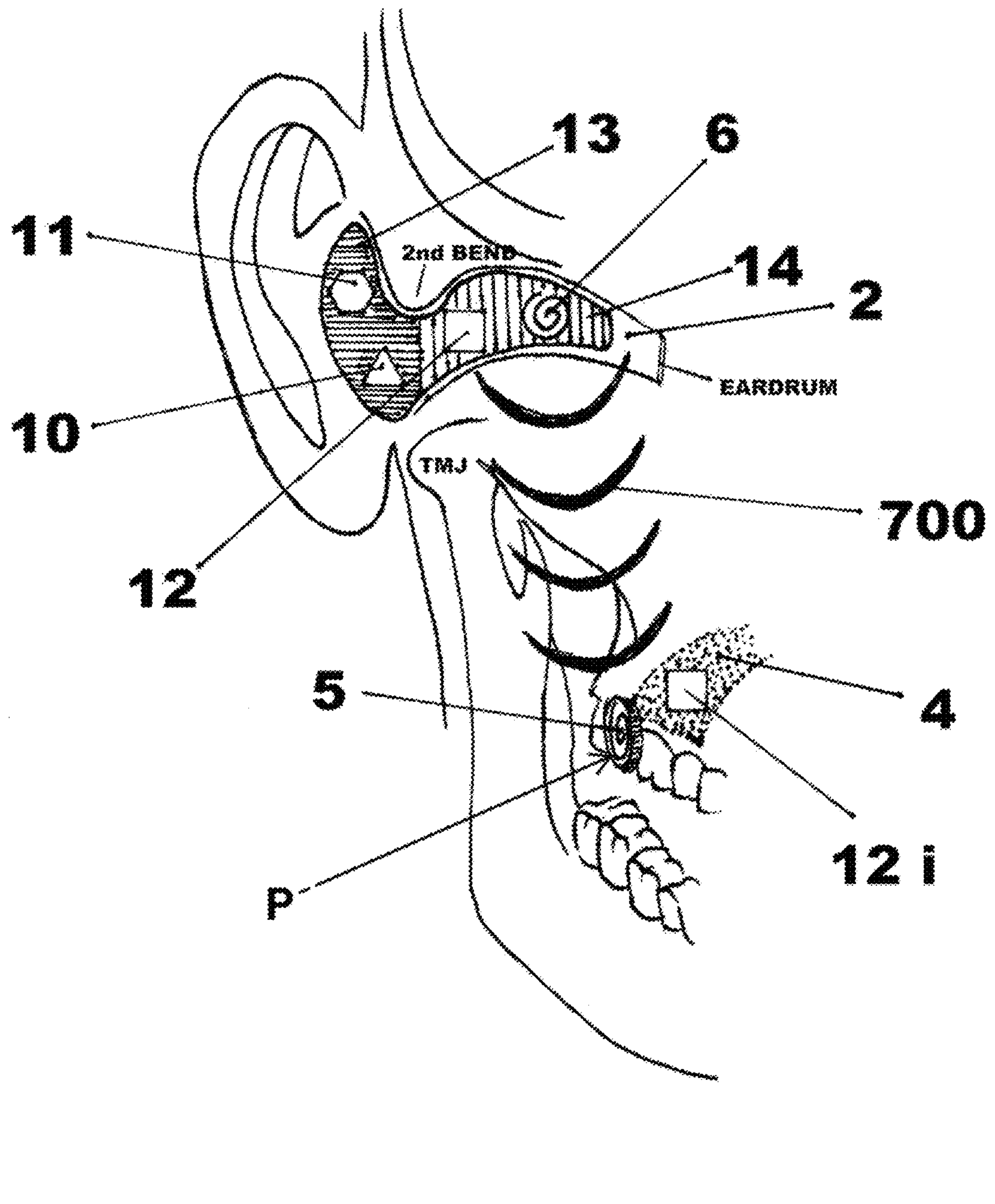
FIG. 6 illustrates an ear canal view of one embodiment of the external unit.

FIG. 6 illustrates an ear canal view of a hearing aid system wherein the housing of the external unit 3 extends from the pinna 1 to include the second bend in the external ear canal 2. Additionally, the housing of the external unit may extend further down the external ear canal 2 just medial to the second bend. In FIG. 6, element 13 indicates portions of the housing of the external unit 3 extending through the second bend of the pinna and element 14 indicates portions of the housing extending just medial to the second bend. This distinction is made because ear impressions taken for the fitting of custom hearing aids or earplugs typically go just medial to the second bend. This has been shown to provide sufficient retention of "in the ear canal" type hearing aids and plugs.

The volume of the housing of the preferred embodiment shown in FIG. 4, most likely can be represented by the anatomical area described by element 13. It is possible, however, as advances in miniaturization are made in electronics, power supply, etc., that all electronic components for an external unit 3 of a hearing aid area may fit within element 14. In one embodiment of the present invention, the external antenna 6 may be located in housing area defined by element 14 as it may present a more favorable position for the external antenna 6 relative to the internal antenna 5.

FIG. 6 further shows the spatially close anatomical relationship between the buccal space of the mouth and the external ear canal. In this example, due to the physical proximity of the area of element 14 to the buccal space, the transmitting antenna 6 is shown disposed in the external canal approximately 2 mm away from the eardrum. It is transmitting through cartilage and bone to the internal unit 4 and its antenna 5, which is disposed in the buccal space lateral to a maxillary molar. Also shown in the internal unit 4 is a control circuit **12*i*** which functions as an electronic controller for that distinct unit.

Figure 7:
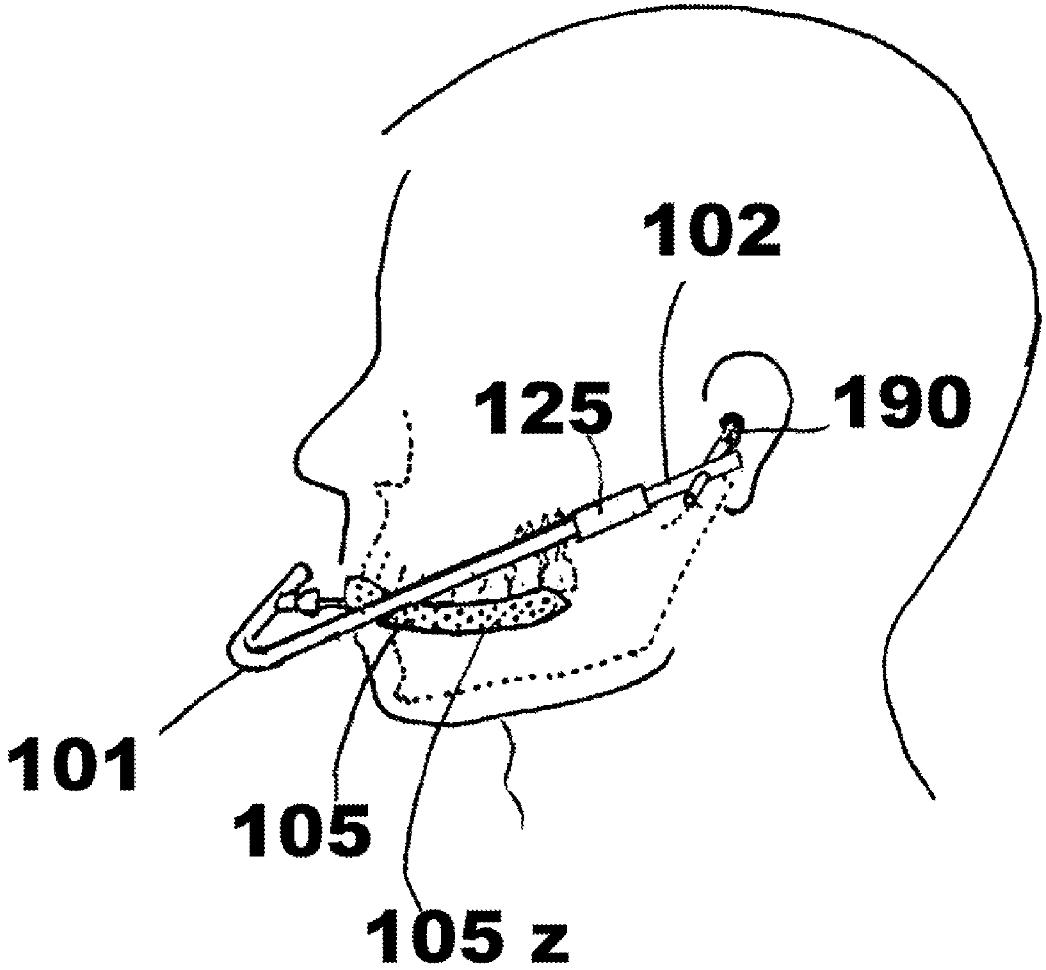
FIG. 7 illustrates a mouth-ear alignment tool in-situ.

FIG. 7 illustrates a novel mouth-ear alignment tool 100 in-situ. As used in this specification, a facebow is an alignment tool, means or apparatus to be used on the skull of a living person for recording the spatial relationship between the anatomy of the ear and the anatomy of the mouth in a manner that is reproducible remote from the skull. The said alignment means is also capable of recording the spatial relationship between at least one tooth in the mouth of a person and ear of that person in order that the positioning of an electronic device that produces or emits magnetic fields or electromagnetic waves from (or to) a device placed inside the mouth can be optimally disposed outside the mouth relative to the device worn inside the mouth, so that the alignment results in the lowest achievable wireless signal transmission power between the two units or devices.

The alignment tool 100 comprises a mouth tray holding portion 101 and an ear tray holding portion 102 joined at a disconnection sleeve 125. The alignment tool is preferably L-shaped. The mouth tray holding portion 101 comprises a tray or holder 105 for holding the impression medium 105*z* and means 150*b* to mount it to the portion 101. The impression medium can be any suitable material used in the art including but not limited to waxes, polyvinylsiloxanes, polyethers, waxes, compounds, plaster of paris. In a preferred embodiment, the tray 105 has walls or flanges 104 which serve to hold the impression material 105*z* in the tray 105. However, tray 105 need not have such walls 104 because other means and methods can be used to hold impression material 105*z* onto the tray 105. For example, the tray can be flat and yet have mesh and adhesive. It can be perforated, have small retentive grooves, or a variety of designs so long as it can hold an impression medium 105*z* in a manner that records the anatomy of teeth and serve as an index of the anatomy. When the tray 105 and the impression material 105*z* are removed from the mouth, a stone cast is poured from the impression and sent to a dental laboratory. At the laboratory, the stone cast is re-seated into material 105*z* that now serves as the orienting index for the stone cast. This methodology to "re-mount" and index this mouth-cast is well-known by dental laboratory technicians who use facebows to articulate dental casts and fabricate dental appliances.

The method for obtaining the indexing or final impression of the mouth is performed using well-known dental techniques. The tray 105 is available in different sizes, as is common in the dental art. The tray is intended to fit the maxillary or top dental arch. The trays 105 are available as separate and possibly disposable items. In a preferred design, the tray 105 connects to the mouth-tray holding portion of the alignment tool 101 via a two-step connecting handle 106 and 107*b*. 107*b* is similar in shape to handle element 107 of the ear impression tray 190. The two-steps (106 and 107*b*) are needed because the handle 106 of the mouth impression tray is larger than the handle 107 of the ear impression tray. Since the female receptacle 108*b* is intended to be similar to (ear) receptacle 108, a "step-down" is required.

The connecting means 107 and 107*b* are sized and configured to fit snuggly into female receptacle 108 and 108*b* which in turn are ball-jointedly connected to the respective tray mounting means 150 and 150*b* in contact with the ear and mouth tray holding portions respectively of the alignment means 100. The tray mounting means 150 and 150*b* are secured on the alignment means 100 by tightening screws 113 and 113*b* respectively.

This mouth impression, like the ear impression to be described below, stays unattached to the alignment tool until BOTH impressions (mouth and ear) have been completed. It ultimately will be joined to the alignment tool through a ball-joint connection 108*b* and secured with a tightening screw 109*b*.

Figure 9:
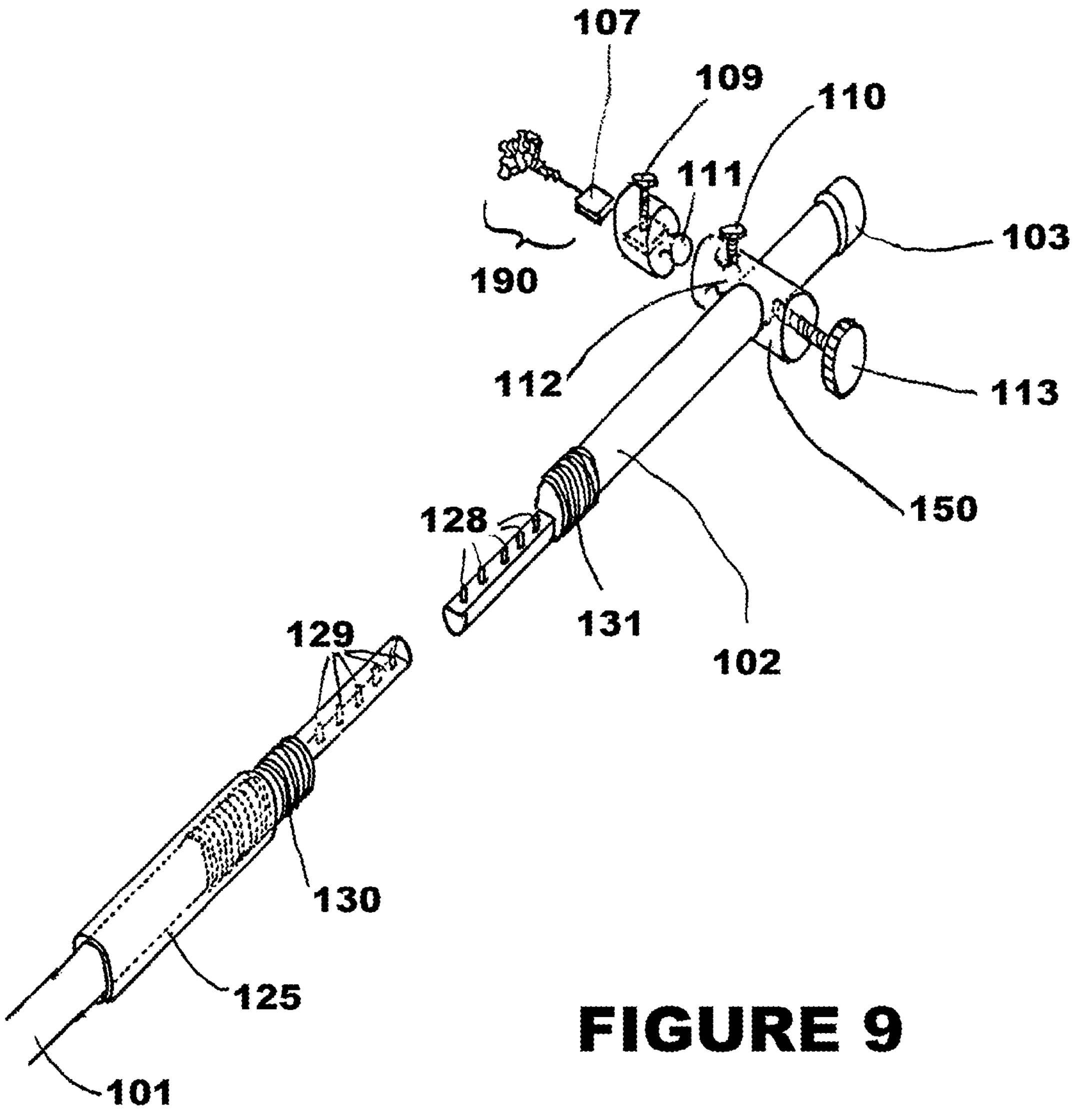
FIG. 9 illustrates an alignment tool ear tray according to one embodiment of the present invention.

FIG. 9 illustrates the ear-tray holding portion 102 of the alignment tool 100 and shows the ear impression tray 190 connected to the portion 102 via a male ball-joint means 111 to a female 112 both of which are part of the mounting means 150. The preferred material for taking ear impressions is a polyvinylsiloxane material, the same material widely used by dental professionals. Because the flow and consistency of the polyvinylsiloxane impression materials can vary, this type of material is preferred for both the mouth and ear impressions. The method taught by this invention for taking the ear impression will depend upon the requirements of the user or patient. The impression-taking technique may include flowing material into the pinna or having an ear loop wire which can be "picked-up" in the impression; other methods typically used by artisans in the art can also be used for a given situation.

Figure 12:
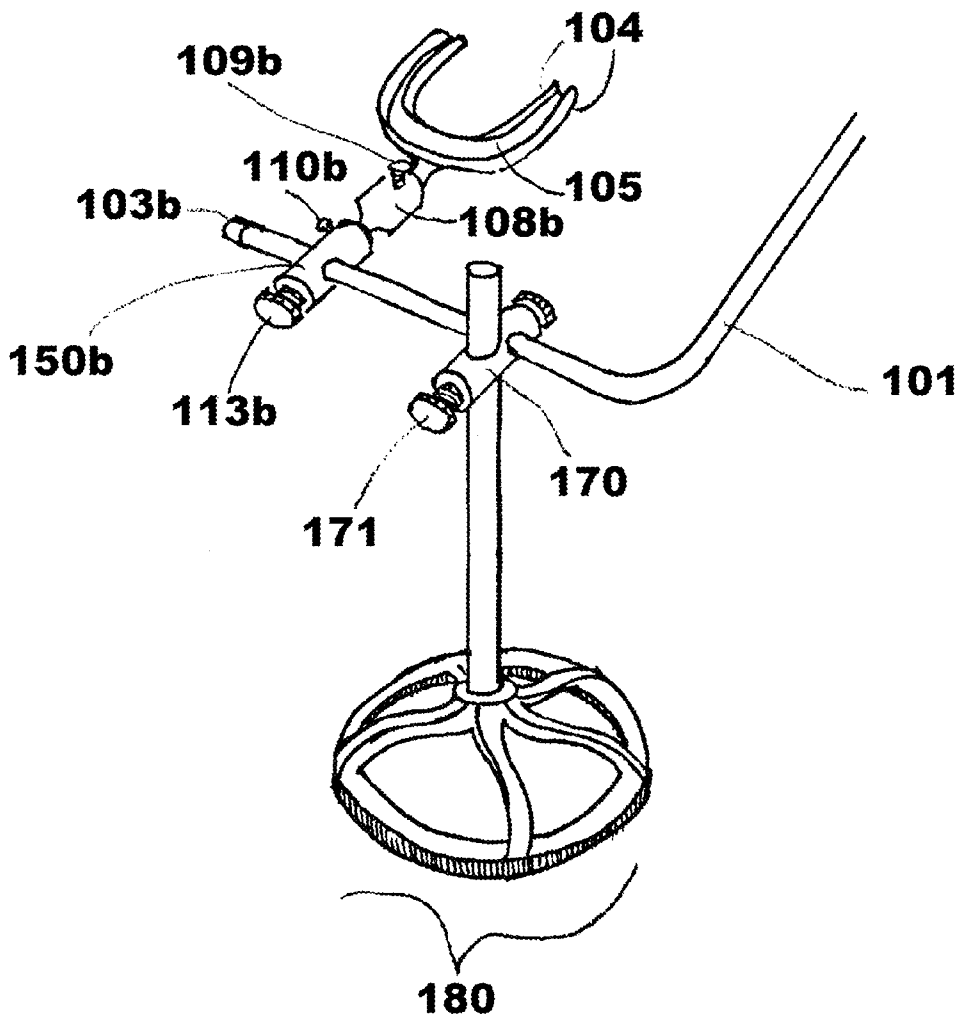
FIG. 12 illustrates a lab stand for holding the mouth-ear alignment tool during system analysis, design, and fabrication.

As shown in FIG. 9, a preferred construct of the alignment tool 100 is one in which portions 101 and 102 are extendably connected via extension means 128 and 129 and extension caps 130 and 131. The extension means can be any suitable means such as pins 128 and corresponding holes 129. The portions 101 and 102 also comprise end caps 103 which facilitate the assembly of mounting means 150 and 150*b* to the alignment tool 100. The endcaps are attached to the alignment tool 100 either through screw fitting or press-fit, and may or may not be of the same material as the alignment tool 100. The mouth impression portion 101 further comprises a laboratory stand mounting connector 170 from which the alignment tool 100 is detached during the anatomy recordation procedure as shown in FIG. 7. The stand mounting connector 170 is screwedly connected to the alignment tool 100 and has a pass through hole through which the stand rod 172 is also screwedly engaged as shown in FIG. 12.

Preferably, the alignment tool 100 is light-weight, rigid and non-magnetic. The light-weight is needed so as not to encumber or cause movement of either the mouth or ear impression after the alignment tool has engaged the impressions as shown in FIG. 7. Metallic tubing has been used in dental facebows and with the proper material selection, such as 303 stainless or aluminum alloy, such tubing may be appropriate. Ideally, the material should not be easily crushed, dented or deformed, as the various set-screws such as 113 and 170 could damage the alignment tool 100. In another embodiment, a solid plastic rod curved into the proper shape and drilled for pins and holes 128 and 129 could also be used.

The tray mounting means 150 and 150*b* for ball jointedly connecting the ear and mouth impression trays to the alignment tool 100 are preferably interchangeable and usable on either portion 101 or portion 102. Thus balls 111 and 111*b*, receptacles 108, set-screws 109, 110, 113, and the overall design and function of tray mounting means 150 is preferably same as 150*b*. The tray mounting means 150 and 150*b* can slide along portions 102 and 101 and when positioned approximately in the center of the mouth (or ear), are affixed by tightening the set screws 113 and 113*b*. Calibration scales (not shown) may optionally be provided along the portions 101 and 102 in slidable engagement with the tray mounting means 150 and 150*b*. Set screws 109 and 109*b* tighten the trays after they have been seated on the person, and screws 110 and 110*b* tighten the ball as the final adjustment before removing the alignment tool from the face to a reproducible location remote from the face.

The portions 101 and 102 are extendedly connected at disconnection sleeve 125 which comprise matable half-round rods 126 and 127 which project from portions 101 and 102 in an opposable manner respectively wherein retaining pins 128 project upward from the flat surface of 127, while pin holes 129 are drilled into 126 and are meant to receive the pins for calibrated extension and disconnection of the ear impression portion from the mouth impression portion. The disconnection sleeve 125 functions to stabilize portions 101 and 102 by engaging screw threads 130 and 131 which are at terminal ends of 101 and 102 respectively. Besides allowing for extendability of the alignment tool, the disconnection sleeve 125 allows the alignment tool to be removed from the person without distorting the impressions or ball-joint positions. By knowing which pin-holes were used, the alignment tool can then be re-assembled on the lab bench using the stand and methods exemplified in FIG. 12. Unlike dental facebows, when both mouth and ear impressions are in place, there is no path of removal without disturbing the ball-joints 150 and 150*b* except via the disconnection sleeve 125 which allows a calibrated disconnection of the alignment tool so that the delicate anatomical orientations captured by the impressions can be reproduced on a laboratory bench top. Following the teachings of this invention, it may be apparent to one of ordinary skill in the art that the alignment tool 100 can further comprise calibration marks, or indeed other paths of disengagement from the face after measurement in a manner that would allow precise reproducibility of the measurements ex-user's face.

The first step in using the alignment tool 100 is to estimate the length of 100 and unscrew the disconnection sleeve 125 to set the pins 128 into their respective pin-holes 129. Then either a final mouth impression or an indexing impression using tray 105 is performed. That tray is then engaged to the alignment tool at set screw 109*b* and then set screws 110*b* and 113*b* loosened and tightened so that the tray mounting means 150 appears to be centered over the meatus of the external ear. Set screws 110 and 113 can also be lightly tightened.

The entire apparatus is then removed from the mouth. Using the ear impression tray 190, an ear impression is made and left in place with the ear impression tray element 107 projecting from the ear. Then the alignment tool is placed back into the mouth. Certain set screws are loosened as necessary so that the ear impression tray element 107 can tightly engage the connecting member 108. Then set screw 109 is tightened. Final adjustments are made to all set screws so that the entire mouth-ear alignment tool is rigid as shown in FIG. 7. Now disconnection sleeve 125 is carefully unscrewed exposing half-rounds rods 126 and 127. They are then separated, freeing portions 101 from 102. Without loosening any other screws, the alignment tool can be removed in two parts. First the ear impression is teased out of the ear, and then the mouth impression is removed.

Once off the face, the mouth-ear alignment tool is reconstituted at the proper pin setting and the disconnection sleeve 125 retightened. Then the lab stand mounting member 170 is attached at an arbitrary place so that it can be easily connected with the lab stand 180. See FIG. 12.

Figure 10:
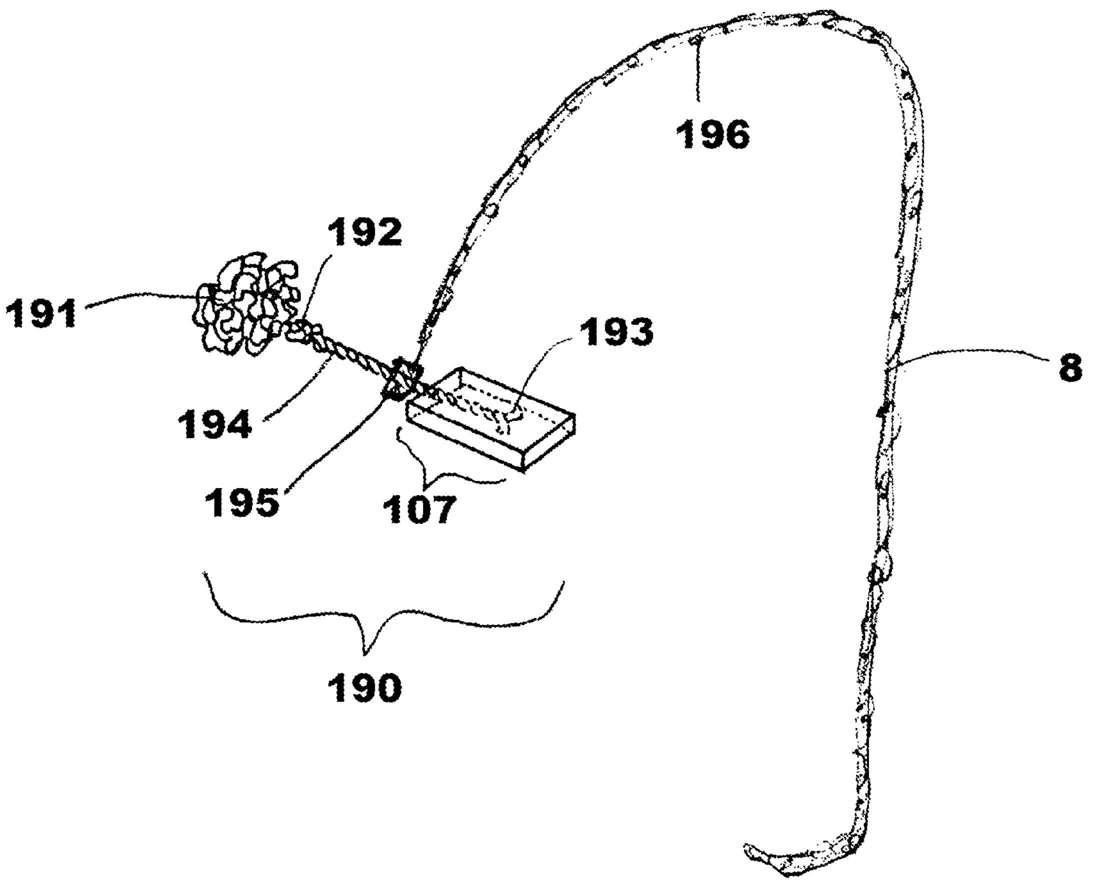
FIG. 10 illustrates an alignment tool's ear tray having an alternate ear loop.

FIG. 10 shows an ear tray 190 according to one embodiment of the present invention. The ear tray 190 comprises fine synthetic mesh material 192 which is similar to the mesh material used in disposable dental bite impression trays, and fine gauge, highly deformable wire 193 (e.g., stainless steel wire of 0.012 diameter). The two materials, mesh 192 and wire 193 are twisted together and the terminal end is potted in a thermoplastic member 107 whose shape is designed to fit precisely into the female receptacle 108 on the mounting means 150. The other terminal end, 191, represents the "otoblock" which is known to artisans familiar with the art of taking ear impressions. The mesh and wire are so configured that the otoblock 191 is primarily entirely soft mesh and its position on the terminal end is established through twisting and bending of the soft thin wire 193. The twisted wire-mesh combination 194 and plastic "handle" of this tray member 107 are intended to project about 3-4 inches outside of the ear canal and pinna. This will place the tray member 107 in a favorable position to engage the ear tray mounting means 150 on the ear impression portion 102 of the alignment tool 100.

In another embodiment, the ear tray 190 may have an ear-loop 8 engaged to it. In this case, the ear-loop is a thin wire 196, about size 0.015 inches that is doubled (or tripled) wrapped around twisted wire-mesh combination 194 by the professional prior to taking the impression. The wire 196 is molded and verified for fit around the subject's ear. This earloop impression wire 196 may not necessarily be the final wire used as the earloop in the finished external unit 3. Instead this wire is used to index the position of where the final earloop should be placed. In the external unit 3 the earloop may be silicone-coated and/or constructed by methods known in the art. The point of engagement of wire 196 to twisted wire-mesh combination 194 is labeled 195. The exact location of the point of engagement 195 is determined through a decision of the professional prior to taking the ear impression. It is important to understand that impression-wire earloop 196 will be held at 195 because of the physical and mechanical properties of the polyvinylsiloxane impression material that coats and covers the entire ear tray 190, except for the terminal area of tray member 107 that engages the alignment tool 100 through the mounting means 150.

The methods of taking the ear impression actually closely resemble those methods used for taking the mouth impression. The tray is coated typically with an adhesive which helps the impression material stick to the tray. The professional places the otoblock 191 just beyond (medial) to the second bend of the ear canal. He then injects impression material all around twisted wire-mesh combination 194 and may extend the material into the pinna area. If an impression earloop 196 is being used, then the impression material must be extended to include engagement point 195 (and perhaps a near part of 196). This is important because the earloop's position and orientation relative to the tray member 107 must be captured by the impression material so that it can be reproduced later at the laboratory.

Figure 11:
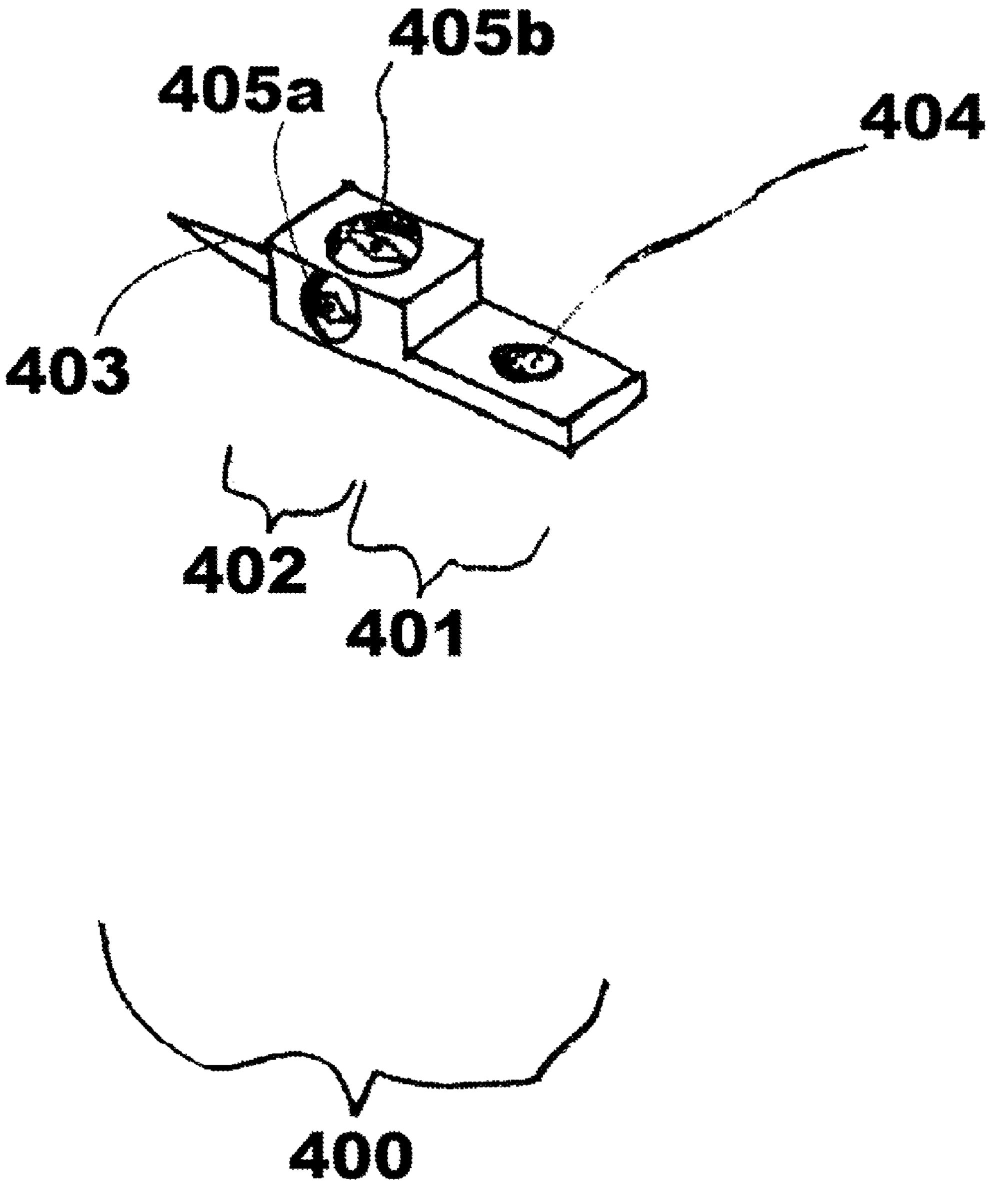
FIG. 11 illustrates a pointer typically usable for external units such as in FIG. 3.

FIG. 11 more fully illustrates the pointer 400 described above in the discussion of the self-customized embodiment of an external unit 3. Self-customization using the alignment tool 100 is to be distinguished from the technician aided customization which is the preferred modality of use of the alignment tool 100. Generally, self-customization will be used for "Send-mode" applications where the antenna orientations, or changes in orientation of the external antenna 6 is difficult for the user to know, particularly without a side-tone (and normal hearing capability by the user). When the user is transmitting their own voice, for example, should the optimum orientation between internal antenna 5 and external antenna 6 become altered, there is a significant chance of increase noise in the signal. Without a side-tone, the user cannot know about this misalignment of antennas, nor importantly, can the user re-align the antennas to the optimum linear orientation without use of this invention. Without the invention, the user is relegated to "trial and error" method of moving the external antenna 6. In many military-type high noise environments, such "trial and error" may not be possible. Use of the pointer presumes that the internal unit 4 and internal antenna 5 will not change position largely because that unit 4 has already been customized, or self-customized and is affixed rigidly against a tooth.

Figure 8:
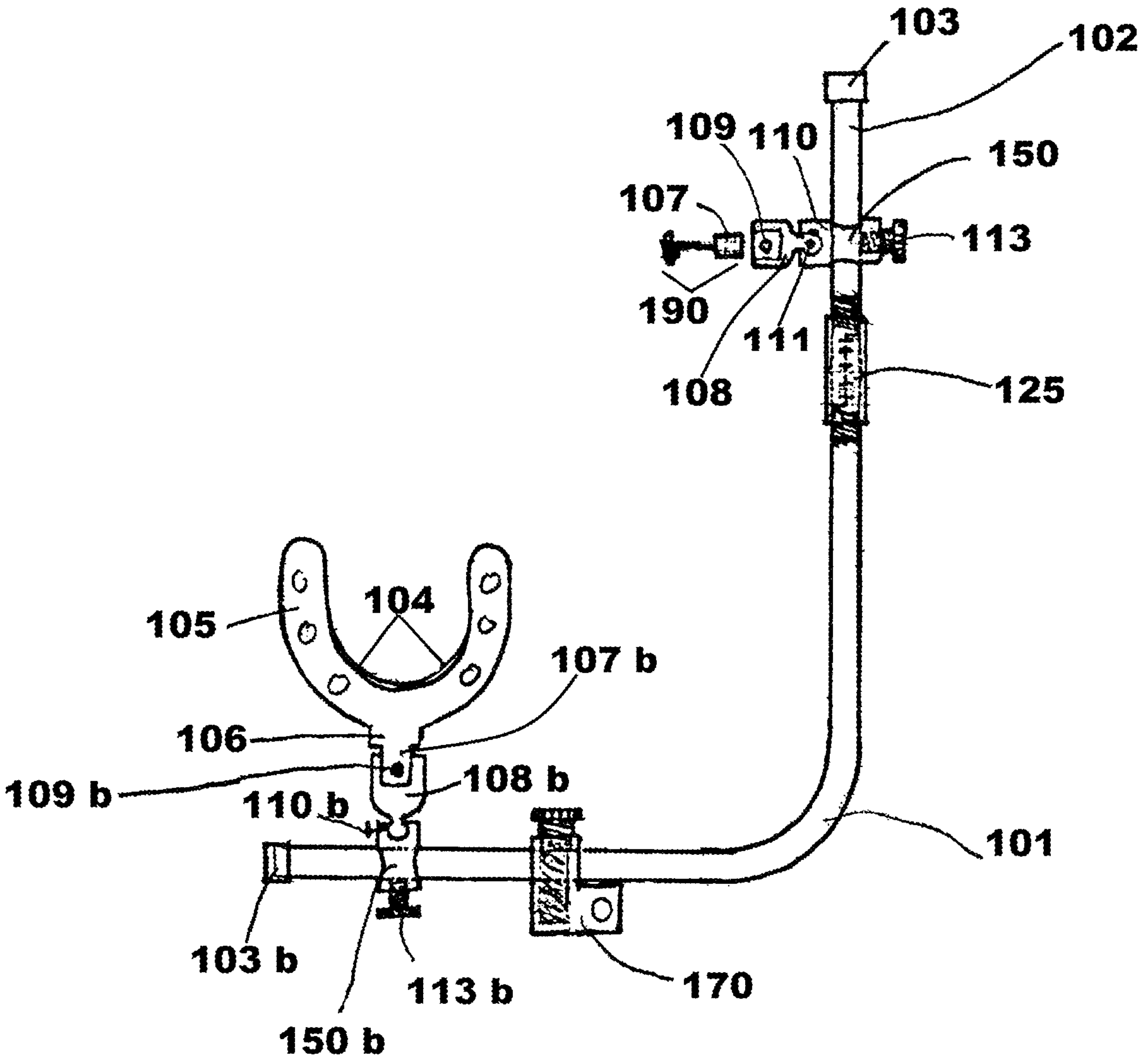
FIG. 8 illustrates a mouth-ear alignment tool according to one embodiment of the present invention.

Pointer 400 resembles the ear tray in that the size and shape of block 401 is the same dimensions as the ear tray member 107. Like 107, the entire pointer 400 is non-metallic plastic, except for compass needles 405*a* and 405*b*. Area 401 engages the ear tray mounting means 150 just as tray member 107 would in the technician aided modality and is locked into the mounting means 150 by the same set-screw 109 as is used in the preferred embodiments described in FIGS. 8 and 9. Set-screw 109 locks pointer 400 at depression area labeled 404. Area 402 of the block contains two compass needles mounted at right angles; the compasses are labeled 405*a* and 405*b*. These two different compasses correspond to two planes of the skull; front-back (horizontal plane or "x"-plane) and up-down (vertical or "y"-plane). A non-metallic pointer-needle 403 is centered and fixed within the pointer 400 as shown in FIG. 11.

The self-customized modality using the pointer 400 is as follows. The alignment tool 100 is modified for length at pins 127 and pin holes 128 and the portions 101 and 102 secured by disconnection sleeve 125. Also as is done in the technician-aided modality, an impression or index impression is taken of the teeth using mouth tray 105. The pointer 400 is tightened into mounting means 150 using set-screw 109 (tightening into 404), but the other set-screws 110 and 113 are not tightened.

The alignment tool is then set aside and the subject obtains a previously built internal unit. This unit may have been made from a professionally made mouth impression or from a self-made impression of the teeth. A small mouth-safe disk magnet is placed over the internal antenna 5 using wax, glue or some adhesive. The magnet is positioned on the buccal side of the internal unit 4 so that the magnet is at the point of optimum reception/transmission efficiency for its paired external antenna 6. In a loop-type design, for example, the magnet would be placed parallel to the plane in the center of the loop. It is understood that the point of optimum reception/transmission efficiency is known by the system designers or manufacturer. Ideally this "optimum point" is the theoretical center of co-planar magnetic fields created by a pair of antennas ideally co-located, one inside the mouth and the other outside the mouth, at a distance of less than 6 inches. As a service to the user prior to sale, the manufacturer may indicate this location on the internal unit 4 with a dot or depression. They also should indicate the "tilt" of the loop and so that a user can replicate that tilt on the buccal surface of the internal unit 4. Thus a small disk magnet could easily "drop-into" the ideal orientation of the antenna 5 on this unit. After the magnet has been properly attached to the buccal surface of the internal unit 4, it is re-seated into the mouth.

The alignment tool 100 is placed back into the mouth, using the teeth index taken previously. The mounting means 150 is rotated and slid back and forth along portion 102 until the pointer needle 403 is parallel to the two compass needles, 405*a* and 405*b*. At that moment, the set-screws 110 and 113 are tightened. The external unit 3 then is placed into or onto the ear. The external antenna 6, wherever it is on that unit, can then be moved, rotated, deflected, etc. so that the antenna is aligned to the area on the cheek pointed to by pointer needle 403. In addition, particularly if it is a loop design, this antenna should be aligned perpendicular to the pointer-needle 403, and centered. The external antenna 6 thus can achieve the optimum location on the skull for reception/transmission relative to the internal antenna 5 of a low-power signal device. Once the location for external antenna 6 is determined, it can be held in that correct orientation with skin tape, helmet straps, wax, self-customized ear plugs, ear hooks, ear loops, putty, or any combination of related means which ultimately hold the external unit 3 in this determined position.

FIG. 12 is the lab stand for holding the mouth-ear alignment tool during system analysis, design, and fabrication. The stand 180 is any suitable stand and can be a basic element to dental alignment tool laboratory transfer technique. It is understood by a skilled artisan in this art that the material of the stand and the alignment tool 100 can be any suitable non-magnetic material. As taught, after the mouth and ear impressions have been made, the representations of the precise mouth and ear anatomy can be placed on the stand 180 and the spatial relationships studied. The stand mounting connector 170 is used to attach alignment tool 100 to the laboratory stand 180. In a preferred embodiment, after the mouth-ear impressions are taken and the spatial relationships recorded, the stand mounting connector 170 is attached to the alignment tool along the length of mouth impression portion 101. It is then secured to the stand 180 by set-screw 171. Should additional support be needed for the (heavy) models of the oral and aural anatomy, boxes and other jigs are an obvious solution. It is also possible that additional means might be needed in the laboratory to prevent slippage of the set-screws 109, 110, 113 and 109*b*, 110*b*, 113*b*, such means being clamps, jigs, glues, are all encompassed by the invention.

It will be apparent to those skilled in the art that various modifications and variations can be made to the present invention without departing from the spirit or scope of the invention. Modification of the above-described assemblies and methods for carrying out the invention, combinations between different variations as practicable, and variations of aspects of the invention that are obvious to those of skill in the art are intended to be within the scope of the claims. The drawings here presented are for illustrative purposed only and are no necessarily drawn to scale. Thus, it is intended that the present invention cover the modifications and variations of this invention provided they come within the scope of the appended claims and their equivalents. Accordingly, the invention is not limited by the embodiments described above which are presented as examples only but can be modified in various ways within the scope of protection defined by the appended patent claims. All references cited in this specification are herein incorporated by reference in their entireties.

What is claimed:

1. A wireless electronic system, comprising:

I. an intra-oral electronic unit comprising an intra-oral directional antenna, said intra-oral unit configured to:
   (A) transduce electrical energy to mechanical energy and impart low amplitude vibrations to at least one tooth of a subject for conduction via a dental bone conduction pathway to an inner ear of the subject; and
   (B) transduce vibrations within the dental bone conduction pathway to electrical energy;

II. an extra-oral electronic unit comprising an extra-oral directional antenna, said extra-oral unit in wireless communication with said intra-oral unit via said intra-oral and extra-oral antennas, wherein the electrical energy is magnetically induced or electromagnetically transmitted between said intra-oral and extra-oral antennas; and III. an alignment tool configured to determine a first orientation of said intra-oral electronic unit and a second orientation of said extra-oral electronic unit, wherein said intra-oral and extra-oral antennas are stably, fixedly and spatially oriented relative to each other for optimal gain and polarization when said intra-oral electronic unit is disposed in said first orientation and said extra-oral electronic unit is disposed in said second orientation, wherein said alignment tool comprises a mouth tray portion and an ear tray portion, wherein said mouth tray portion includes an oral impression material holding tray, and said ear tray portion including an ear impression material holding tray.

2. The system of claim 1, wherein said alignment tool is further configured to determine a distance between an intra-oral position on the subject and an extra-oral position on the subject, wherein said intra-oral and extra-oral antennas are stably, fixedly and spatially oriented relative to each other when said intra-oral electronic unit is disposed at said intra-oral position and in said first orientation and said extra-oral electronic unit is disposed at said extra-oral position and in said second orientation.

3. The system of claim 2, wherein said intra-oral position is less than about six inches from said extra-oral position.

4. The system of claim 1, wherein an application of low-amplitude vibrations to the at least one tooth of the subject and conduction to the inner ear of the subject results in perception of speech.

5. The system of claim 1, wherein said system is configured to treat motion sickness in the subject by canceling low frequency waves at an otolith of the subject.

6. The system of claim 1, wherein said system is configured to treat stuttering by the subject, said system further comprising a feed-back system configured to recognize stuttering and generate a blocking signal associated with said recognized stuttering.

7. The system of claim 1, wherein said system is configured to treat tinnitus in the subject by generating a white noise signal via the dental bone conduction pathway.

8. The system of claim 1, further comprising a sensor operably associated with said intra-oral unit and configured to detect the low-amplitude vibrations and generate and transmit a signal to a receiver disposed outside a mouth of the subject.

9. The system of claim 8, wherein said receiver is configured to interpret said transmitted signal as a skull trauma.

10. The system of claim 8, wherein said receiver is configured to uplink said signal to a remote system.

11. The system of claim 8, wherein said receiver is a device configured to interpret said transmitted signal as non-speech breath sounds.

12. The system of claim 11, wherein said non-speech breath sounds are indicative of a condition selected from the group consisting of a breath obstruction, a respiratory disease, a speech impediment, a vocal cord dysfunction, and a throat dysfunction.

13. The system of claim 1, wherein the electrical energy is electromagnetically transmitted between said intra-oral antenna and said extra-oral antenna, and produces an electromagnetic field having a strength of less than or equal to 0 dBM.

14. The system of claim 1, wherein a portion of said intra-oral antenna is directly potted by medical grade silicone material.

15. The system of claim 14, wherein said medical grade silicone material is further encased in a mouth safe polymer.

16. The system of claim 1, wherein said intra-oral electronic unit further comprises an attachment mechanism configured to engage the at least one tooth of the subject.

17. The system of claim 1, wherein said alignment tool further comprises an apparatus comprising an alignment marker and magnetic needles embedded therein, said needles configured to align with said alignment marker when said intra-oral and extra-oral antennas are disposed in said first and second orientations, respectively.

18. The system of claim 1, wherein said mouth tray portion is movably coupled to said ear tray portion.

* * * * *